United States Patent
Chiang et al.

(10) Patent No.: US 8,600,446 B2
(45) Date of Patent: Dec. 3, 2013

(54) MOBILE DEVICE INTERFACE WITH DUAL WINDOWS

(75) Inventors: Ching-Liang Chiang, Taoyuan (TW); Chi-Pang Chiang, Taoyuan (TW); Chih-Wei Tai, Taoyuan (TW); Chao-Yi Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 904 days.

(21) Appl. No.: 12/239,529

(22) Filed: Sep. 26, 2008

(65) Prior Publication Data

US 2010/0081475 A1    Apr. 1, 2010

(51) Int. Cl.
*H04M 1/00*    (2006.01)

(52) U.S. Cl.
USPC ............ 455/566; 455/550.1; 455/414.1; 455/415; 455/575.1

(58) Field of Classification Search
USPC ............ 455/569, 566, 550.1, 414.1, 415; 715/788
See application file for complete search history.

(56) References Cited

U.S. PATENT DOCUMENTS

| 2006/0085384 A1* | 4/2006 | Sato et al. .................. 707/1 |
| 2007/0036346 A1* | 2/2007 | Kwon .......................... 379/413 |
| 2008/0096593 A1* | 4/2008 | Park ............................ 455/466 |
| 2008/0119237 A1* | 5/2008 | Kim ............................ 455/566 |
| 2008/0204424 A1* | 8/2008 | Jin et al. ...................... 345/173 |
| 2009/0298418 A1* | 12/2009 | Michael et al. ............. 455/3.04 |

FOREIGN PATENT DOCUMENTS

EP    1648149 A1    4/2008

* cited by examiner

*Primary Examiner* — Manpreet Matharu
(74) *Attorney, Agent, or Firm* — Perkins Coie LLP

(57) ABSTRACT

A mobile device having a user interface supporting multiple windows is disclosed. The user interface is suitable for use in any device having a handheld form factor, such as a mobile phone or mobile Internet device. The user interface includes two windows that are displayed on the mobile device's screen. The mobile device may be configured to switch between a single window mode and a dual window mode. The device may also be configured to launch applications in either mode. It may be configured to switch between modes automatically or in response to a user command. The windows may also be re-oriented in response to a change in the device's orientation or to a user's command.

26 Claims, 15 Drawing Sheets

MOBILE DEVICE INTERFACE WITH DUAL WINDOWS

BACKGROUND

As mobile technology improves, mobile devices have become smaller and more powerful. The wireless networks they connect to have improved, as well. These improvements mean that mobile devices can now connect to networks for many functions beyond simple voice calling. For example, they can be used to send e-mail, browse the Internet, and send instant messages. Many devices also include a Global Positioning System (GPS) receiver with integrated mapping (or maps downloaded from a network). In some cases, the mobile devices support wireless standards providing local connectivity, such as the 802.11 family of protocols or Bluetooth. These standards can enable the devices to connect to a WLAN or even communicate with other mobile devices in a peer-to-peer mode.

Unfortunately, usability has not kept pace with these increased capabilities. The paradigms that work on a desktop do not work on a mobile device because of the size difference. For instance, the standard user interface (UI) on a personal computer (such as a device running Microsoft Windows or MacOS) uses multiple overlapping windows that can be moved around, resized, or closed as needed. That type of UI works well on a screen that is 12" or larger, but is impractical on a screen that only measures a few inches. Thus, mobile devices have historically been limited to a single window. Even devices with relatively large screens use only a single window with a touch screen or stylus input. Therefore, there is a need for better user interfaces to make use of these new capabilities. As technology improves, it would be useful to have a user interface for a mobile device that can better make use of the increased capabilities.

DETAILED DESCRIPTION

A mobile device having a user interface supporting multiple windows is disclosed. The user interface is suitable for use in any device having a handheld form factor, such as a mobile phone or mobile Internet device. The user interface includes two windows that are displayed on the mobile device's screen. The mobile device may be configured to switch between a single window mode and a dual window mode. The device may also be configured to launch mobile applications, such as a dialing application or a contacts application, in either mode. It may be configured to switch between modes automatically or in response to a user command. The windows may also be re-oriented in response to a change in the device's orientation. In some embodiments, the windows are square and so can be re-oriented without modifying their contents.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
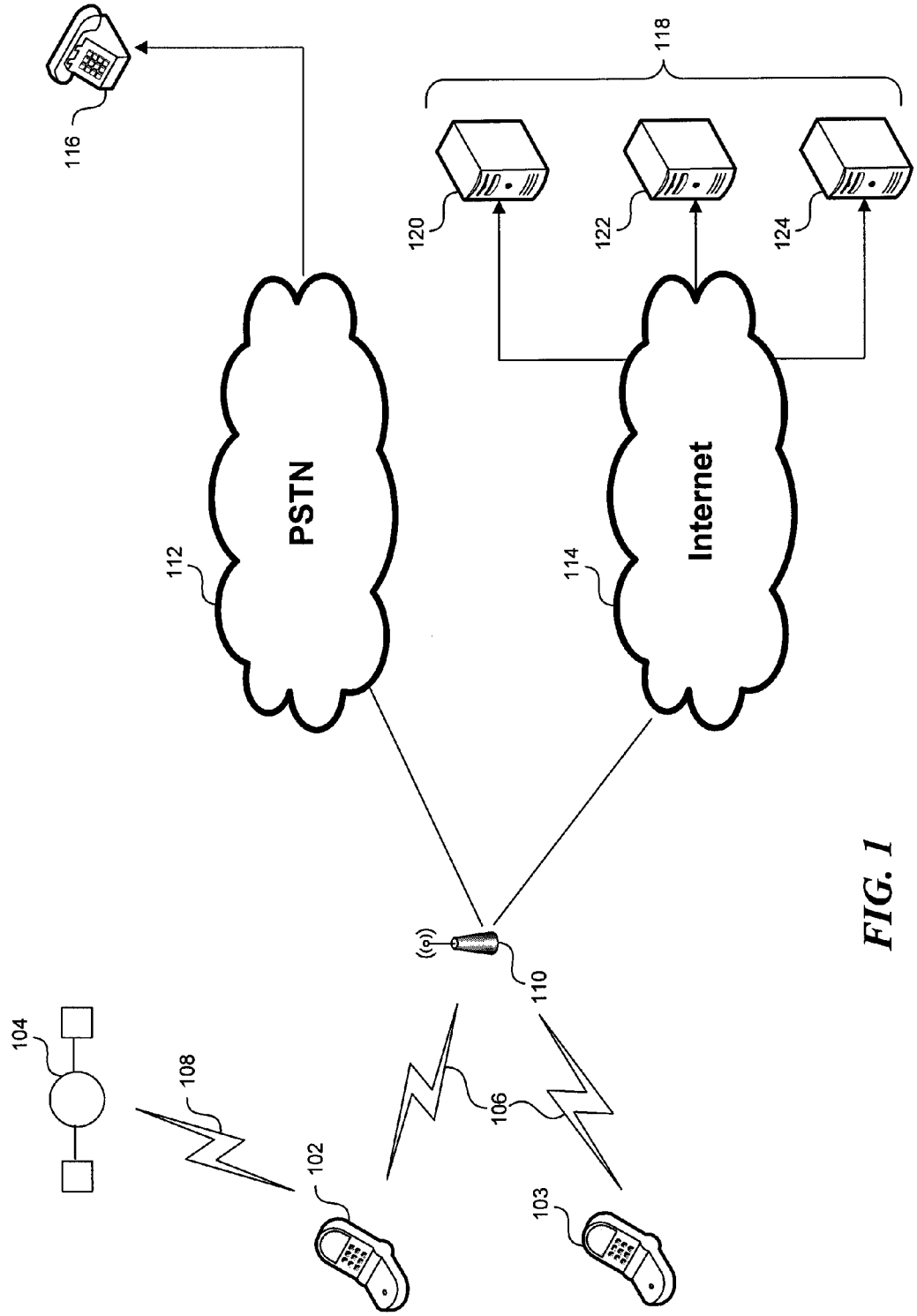
FIG. 1 is a block diagram of a representative environment in which a dual window system operates.

FIG. 1 is a block diagram of a representative environment in which a dual window system operates. A plurality of mobile devices 102 and 103 roam in an area covered by a wireless network. The mobile devices are, for example, cellular phones or mobile Internet devices. The mobile devices 102 and 103 communicate to a base station 110 through a wireless connection 106. The wireless connection 106 could be implemented using any system for transmitting digital data. For example, the connection could use a cellular network implementing UMTS or CDMA2000 or a non-cellular network implementing WiFi (IEEE 802.11) or Bluetooth. Although wireless connections are most common for these mobile devices, the devices may also communicate using a wired connection such as Ethernet. In some embodiments, the mobile devices 102 and 103 are configured to connect using multiple protocols depending on the situation. For example, the devices could be configured to use WiFi when possible and switch to a slower cellular network such as EDGE otherwise.

In some embodiments, the mobile device 102 also has a Global Positioning System (GPS) receiver embedded in it to provide location information. In these embodiments, the mobile device 102 also receives a location signal 108 from one or more GPS satellites 104. For clarity, the figure only shows one satellite. However, a GPS-enabled device generally receives location signals 108 from several satellites, because a GPS receiver requires several satellites in order to determine its location. Also, although the mobile device 102 in FIG. 1 uses a satellite connection to determine location, it could also determine location based on its position relative to one or more base stations in a cellular network, or using other methods known in the art.

The base station 110 is connected to one or more networks that provide backhaul service for the wireless network. The base station 110 is connected to the Public-Switched Telephone Network (PSTN) 112, which provides a connection between the mobile network and a remote telephone 116 on another network. When the user of the mobile device 102 makes a voice telephone call, the base station 110 routes the call through the wireless network's voice backhaul (not shown) to the PSTN 112. The PSTN 112 then automatically connects the call to the remote telephone 116. If the remote telephone 116 is another mobile device, the call is routed through a second wireless network backhaul to another base station.

The base station 110 is also connected to the Internet 114, which provides a packet-based connection to remote devices 118 supporting network applications. When the user of the mobile device 102 makes a data connection, the base station routes the packet data through the wireless network's data backhaul (not shown) to the Internet 114 (or another packet-based network). The internet connects the wireless network to remote devices 118, including an e-mail server 120, a web server 122, and an instant messenger server 124. Of course, the remote devices 118 could include any application available over the Internet, such as a file transfer protocol (FTP) server or a streaming media server. The remote devices could also include other personal computers or mobile devices, where the mobile device 102 is connected through a peer-to-peer connection. This might be used to provide voice services over a data network, such as through Voice over Internet Protocol (VoIP).

Figure 2A:
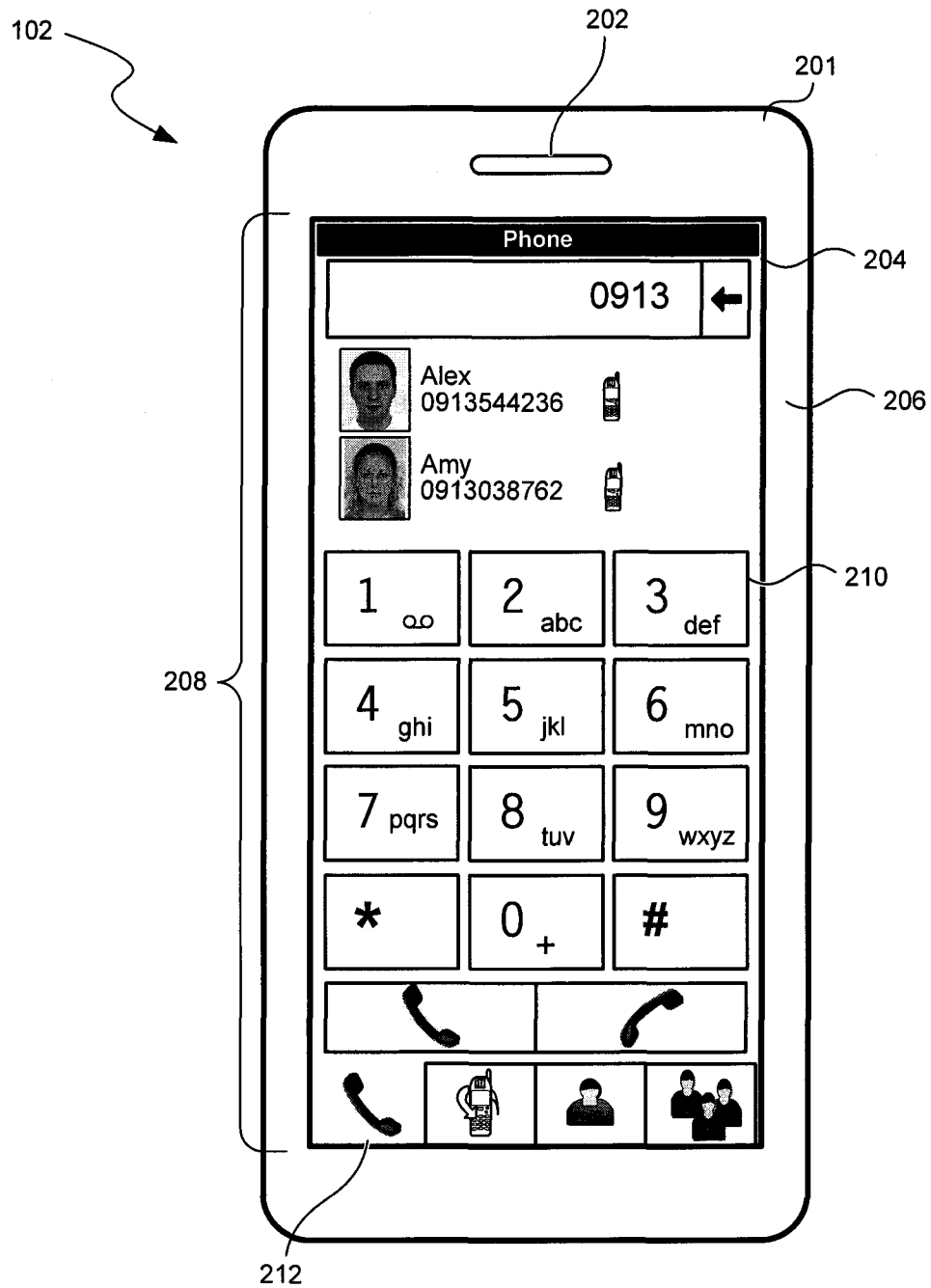
FIG. 2A illustrates a representative interface of a mobile device operating in a single window mode.

FIG. 2A illustrates a representative interface of a mobile device 102 operating in a single window mode. As shown in FIG. 2A, the mobile device 102 can include a housing 201, a speaker 202, and a display 204 carried by the housing 201. The mobile device 100 can also include push buttons, control keys, microphones, transceivers, photo sensors, and/or other computing components generally found in PDA devices, cellular phones, laptop computers, tablet PCs, smart phones, hand-held email devices, or other mobile communication/computing devices.

The display 204 can include a liquid-crystal display (LCD), a plasma display, a vacuum fluorescent display, a light-emitting diode (LED) display, a field emission display, and/or other suitable types of display configured to present a user interface. The mobile device 102 can also include a touch-sensitive screen 206 configured to receive input from a user. For example, the touch-sensitive screen 206 can include a resistive, capacitive, infrared, surface acoustic wave (SAW), and/or other types of touch screen. The touch-sensitive screen 206 can be integrated with the display 204 or can be independent from the display 204. In the illustrated embodiment, the touch-sensitive screen 206 and the display 204 have generally similarly sized access areas. In other embodiments, the touch-sensitive screen 206 and the display 204 can have differently sized access areas. For example, the touch-sensitive screen 206 can have an access area that extends beyond a boundary of the display 204.

In certain embodiments, in addition to or in lieu of the touch-sensitive screen 206, the mobile device 102 can also include a pressure sensor, a temperature sensor, and/or other types of sensors (not shown) independent from or integrated with the display 204. For example, the mobile device 102 can include a thermocouple, a resistive temperature detector, and/or other types of temperature sensors proximate to the display 204 for measuring a temperature of an input mechanism, the display 204, and/or the touch sensing component 206.

The mobile device 102 may have any form factor and control mechanism commonly used in the industry. For example, the mobile device 102 could provide the user a variety of control mechanisms, such as a stylus interface. The device could also allow the user to control applications using arrow buttons or a joystick. The device could also have a folding form factor, where the screen is located on the inside of the device and is exposed when the user folds the device open. The device could also be configured as a slider, with a keyboard or number pad that is exposed when the user slides the device to its open position.

FIG. 2A also shows a representative single window interface 208 for the mobile device 102. The single window interface 208 is shown in FIG. 2A running a telephone dialing application. The dialing application includes a number pad 210, which enables a user to dial telephone numbers directly. The dialing application also includes a set of tabs 212 at the bottom that allow the user to choose different functions to execute. In the displayed interface, the phone tab is selected, which allows the user to initiate a new telephone call. The tabs 212 might also support additional functions, such as instant messaging (IM) or conference calling.

Figure 2B:
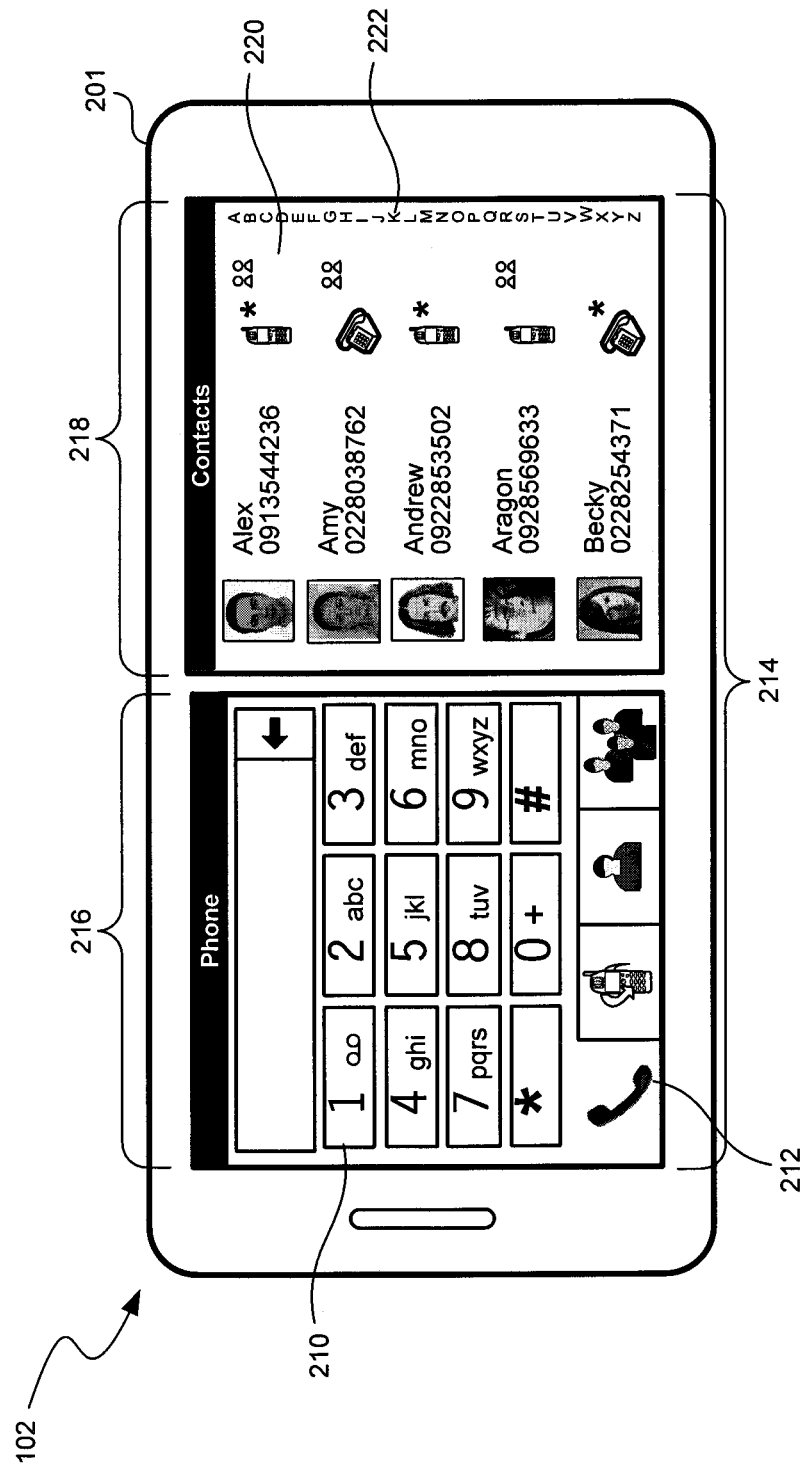
FIGS. 2B and 2C illustrate a representative interface having dual windows in landscape and portrait orientations.
Figure 2C:
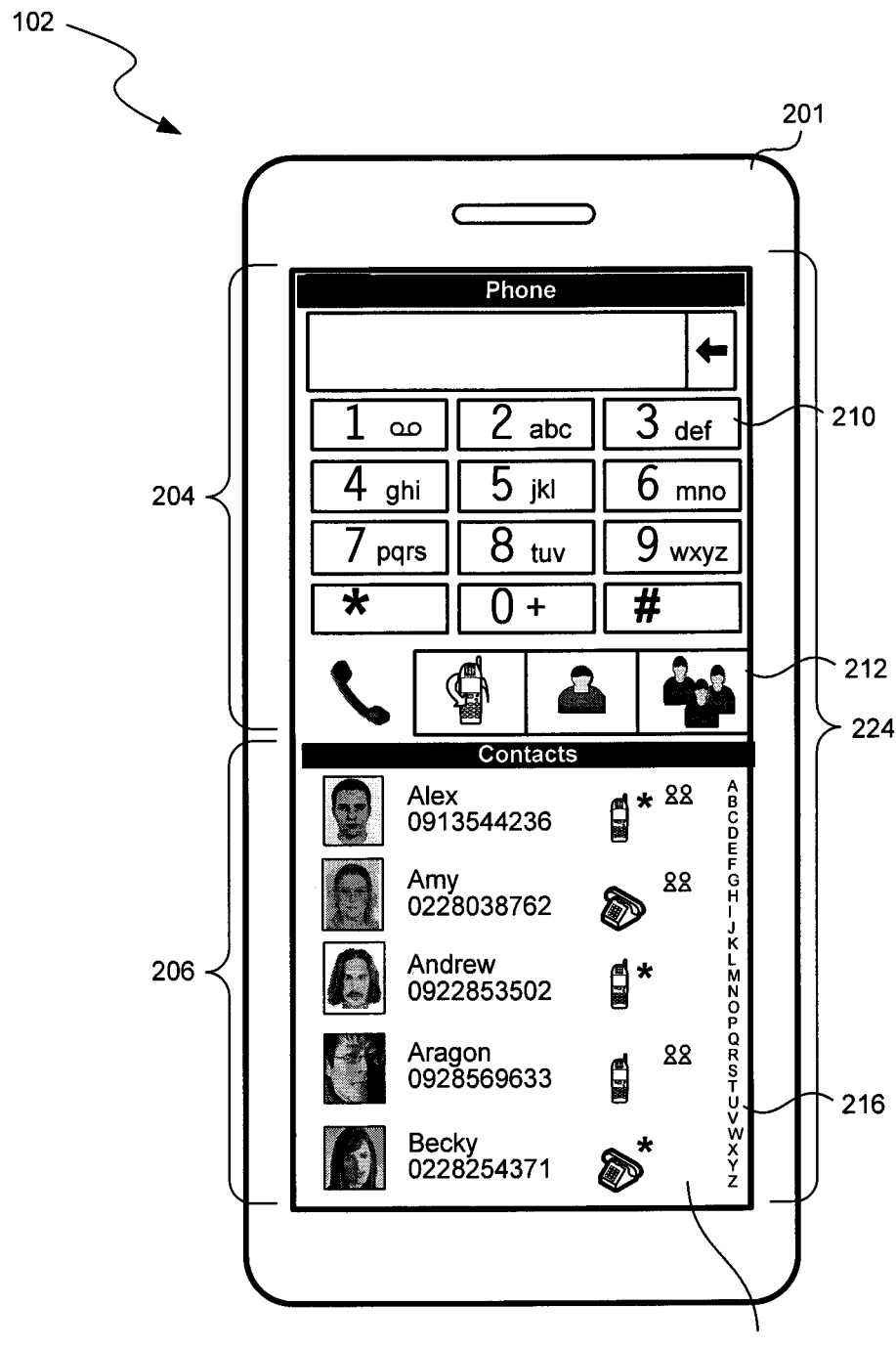

FIGS. 2B and 2C illustrate a representative interface 214 for a mobile device 102 supporting a dual window interface. FIG. 2B shows the interface 214 in landscape mode while FIG. 2C shows the interface 224 in portrait mode. The mobile device 102 may be configured to switch the interface 214 between landscape and portrait mode when the user selects a configuration setting or presses a button on the device. The mobile device 102 may also be equipped with a motion sensor for detecting the device's current orientation. The mobile device 102 may then be configured to automatically switch between modes when the motion sensor detects a change in orientation. The device may also be configured to switch modes in response to other actions on the device. For example, the device may include a sliding keyboard and may be configured to switch from portrait mode to landscape mode when the user opens the keyboard.

In FIGS. 2B and 2C, the mobile device 102 is shown running contacts and dialing applications in dual-window mode. The applications include a dialing window 216 and a contacts window 218. The contacts window 218 displays a list of contacts that have been stored in the mobile device 102. Each contact list item 220 displays the contact's name, phone number, and picture. The contact list item 220 also includes icons informing the user of the type of phone number displayed (e.g. fixed or mobile) and notifying the user that there is more information for the contact. For example, contact list item 220 includes an icon informing the user that the contact's instant messenger contact information is stored. The contacts window 218 includes an alphabetical scrollbar 222 on the side that allows the user to easily move between parts of the contacts list.

The dialing window 216 allows the user to take action based on the contact or contacts that have been selected from the contacts window 218. As with the single window interface 208, the dialing window 216 in the dual window interface 214 has a set of tabs 212 at the bottom that allow the user to choose different functions to execute. The user may also be able to initiate a call to a contact by dragging the contact list item 220 from the contacts window 218 to the dialing window 216. The dual window system can be used to support a variety of applications on the mobile device 102, as will be discussed below.

The interface 202 is designed so that the dual windows can be displayed equally well in either portrait or landscape mode. This allows the device to better conform to the user's needs. In some embodiments, each window is a square, so that the long axis of the screen is twice the length of the short axis. In these embodiments, the windows can be rotated when the device switches modes without having to scale or modify the windows.

Figure 3:
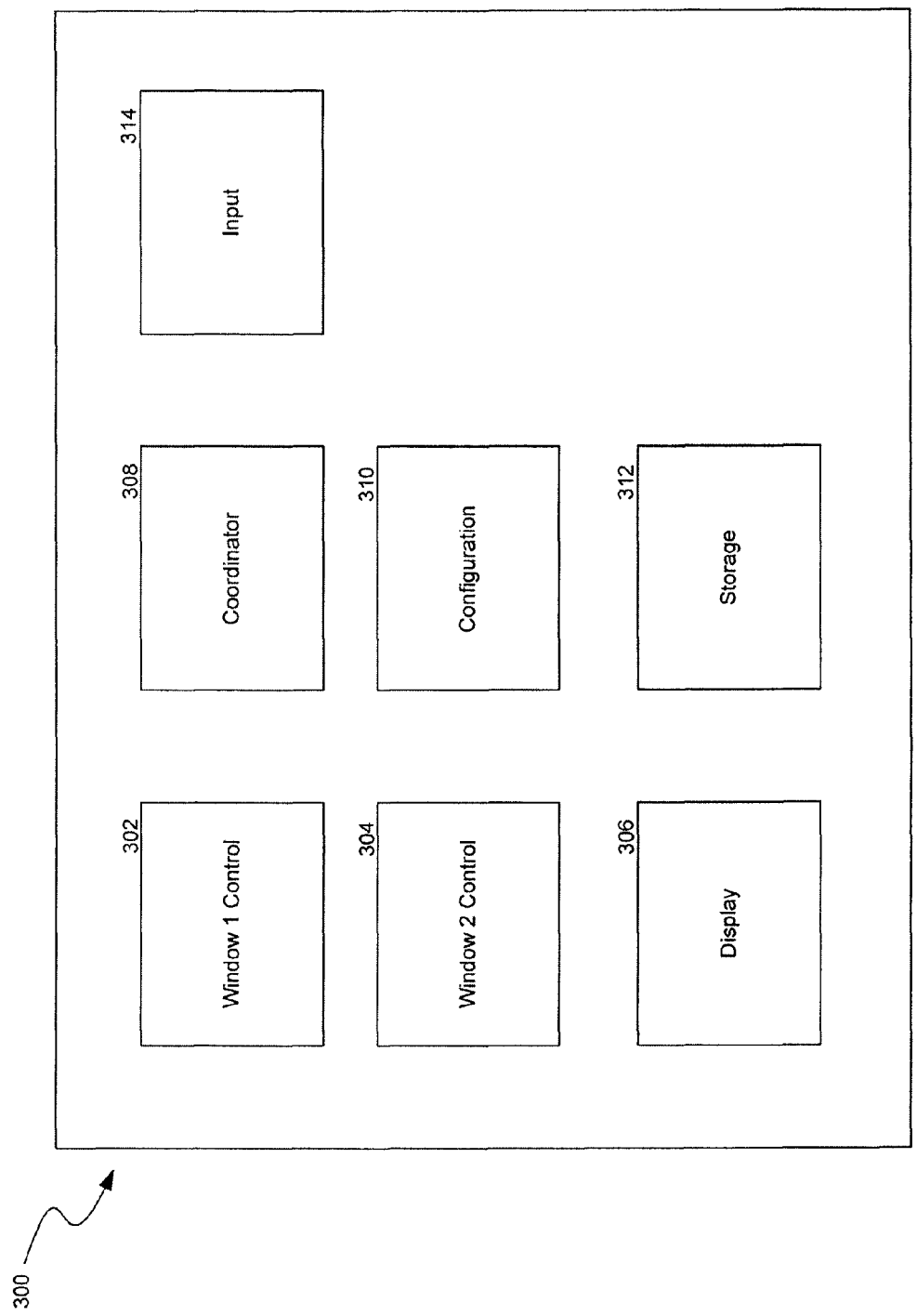
FIG. 3 is a block diagram of a software system supporting a dual window interface.

FIG. 3 is a block diagram of a software system 300 supporting a dual window interface on a mobile device 102. As will be described in additional detail herein, the software system 300 includes a number of modules to facilitate the display functions of the system. Although the various modules are depicted in a single software application, the modules may also be run in separate components or processes that collaborate. Many of these functions could be provided by the operating system of the device, rather than by the specific application. In some embodiments, some of the modules are implemented in hardware instead of software. Further, although some modules are shown as separate components, the modules could also be implemented in a single component for efficiency or convenience. In addition, the storage area could be local storage or remote storage that is accessed through a network connection. The code to support the functionality of this system may be stored on a computer-readable medium such as an optical drive, flash memory, or hard drive.

The system includes window control modules, window 1 control module 302 and window 2 control module 304, which control the display provided to each of the windows when the mobile device 102 is operating in dual window mode. Each control module determines what should be displayed on its respective window and processes inputs to the window. Of course, when the mobile device 102 operates in single window mode, window 2 control 304 is inactive, while window 1 control 302 is active to manage the appearance of the full screen.

Window 1 control module 302 and window 2 control module 304 work in conjunction with the display module 306 to display the dual windows. The display module 306 provides an interface between the software system 300 and the hardware controlling the pixels of the mobile device's screen. In single window mode, the display module 306 interacts only with window 1 control module 302. Similarly, window 1 control module 302 and window 2 control module 304 work in conjunction with the input module 314 to receive control and data from the user through the mobile device's input systems, such as the touch-sensitive screen 206 or keyboard. The input module 314 may have multiple submodules to process input from each of these input systems.

The software system 300 also includes a coordinator module 308, which coordinates activities between window 1 control module 302 and window 2 control module 304. While the window control modules 302 and 304 are concerned only with the functioning of their individual windows, the coordinator module 308 is concerned with the functioning of the whole interface. For example, the coordinator module 308 activates or deactivates the window control modules to switch the mobile device 102 between single window mode and dual window mode. When the mobile device 102 is in dual window mode, the coordinator module 308 provides communication between the window controllers to enable functions requiring interaction between the two windows. In some embodiments, the coordinator module 308 enables action in one window to cause a result in the other window by passing data or commands between the two window controllers 302 and 304. The coordinator module 308 may inform the window modules of the orientation of the mobile device 102. The modules may then use this information to modify the appearance of the windows based on that information, such as by changing the orientation of a square window as discussed above. The coordinator module 308 also informs the window control modules on how the resources of the device are shared. It could, for example, allocate more screen space to one window control while leaving a small area to the other window control. This could allow the device to maintain one small window for notifications (such as notice of a new e-mail message) while the user works in the other window.

The software system 300 includes a storage module 312, which allows the system to read and store data. The physical storage may be, for example, a hard drive, a memory card, or system memory, depending on the configuration of the device and the needs of the applications.

The software system 300 has a configuration module 310, which provides configuration information for the system. The configuration information includes, for example, a setting specifying whether the display should be in single window mode or in dual window mode at startup. The setting may be a hard-coded default value (such as always starting the device in single window mode) or may be based on the setting the previous time the device was used. The system may also be configured to always launch an application in dual window mode if the application is capable of supporting that mode. The configuration module 310 interacts with the storage module 312 to persist these settings.

The software system 300 may also have other standard modules that are not shown. For example, certain communication and web interface modules may be present but are not depicted for purposes of clarity. The operation of each of these modules is described in additional detail below with reference to FIGS. 4-5 and 7-9.

Figure 4:
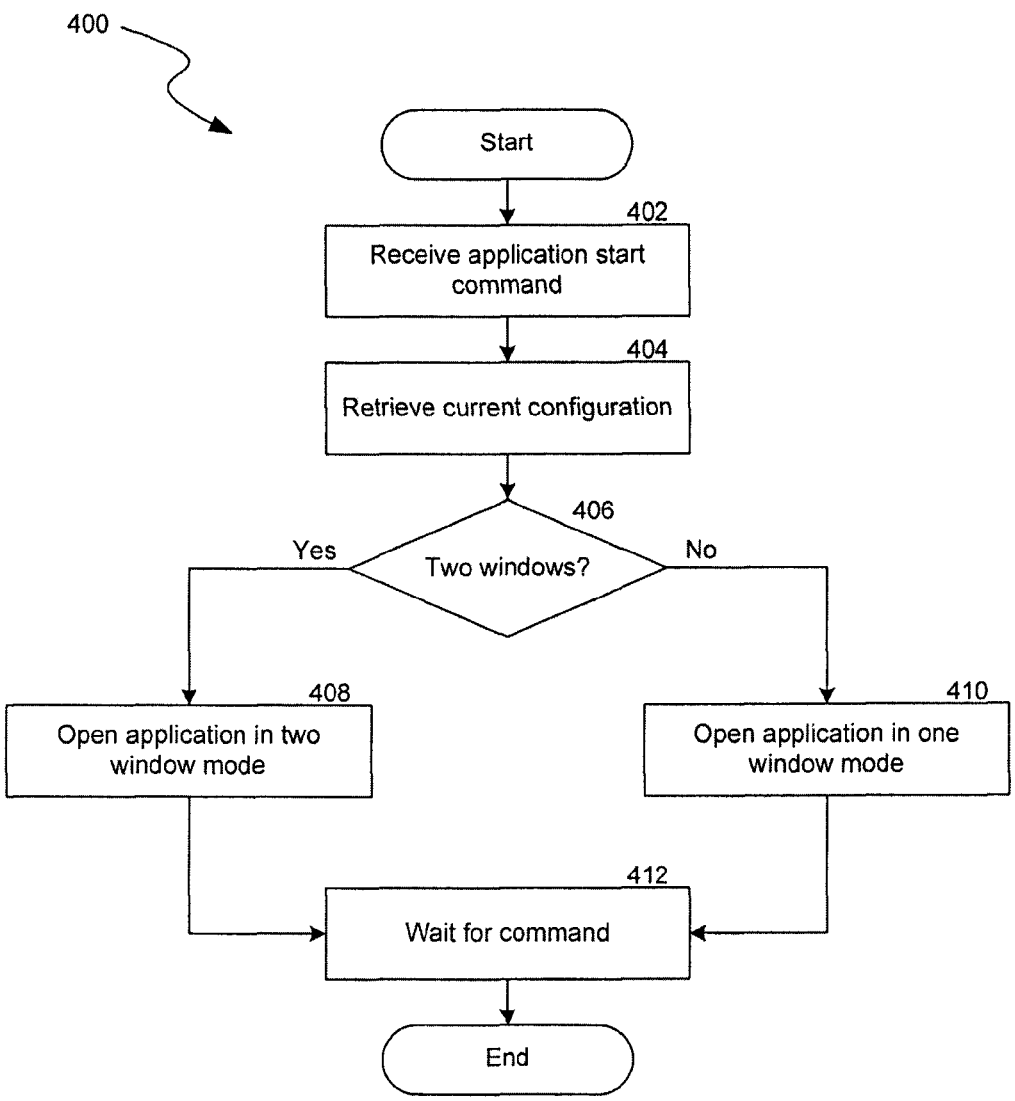
FIG. 4 is a flow chart of a process implemented by a dual window system for starting a new application.

FIG. 4 is a flow chart of a process 400 implemented by the dual window system for starting a new application. At block 402, the system receives a command to start a new application. The start command may be automatic or may come from a user command received by the input module 314. After receiving the start command, the system finds the correct application and begins the launching process.

After the start command is received, the system proceeds to block 404, where the coordinator module 308 asks the configuration module 310 for the configuration information associated with the application being launched. The configuration information includes a variety of information and, in particular, includes information on how the windows are to be configured. The configuration information may be application-specific or may be determined from system-level configuration settings or default values. The system then proceeds to decision block 406, where it determines from the configuration whether the application is to be launched in a single window configuration or in a dual window configuration.

If the configuration specifies that the application is to be launched in a single window configuration, the system proceeds to block 410, where it opens the application in single window mode. If the configuration specifies dual window configuration, the system proceeds to block 408, where the coordinator module 308 launches the application in dual window mode. In either case, processing proceeds to block 412, where the system waits for the next command from the user or continues with startup processing.

Figure 5:
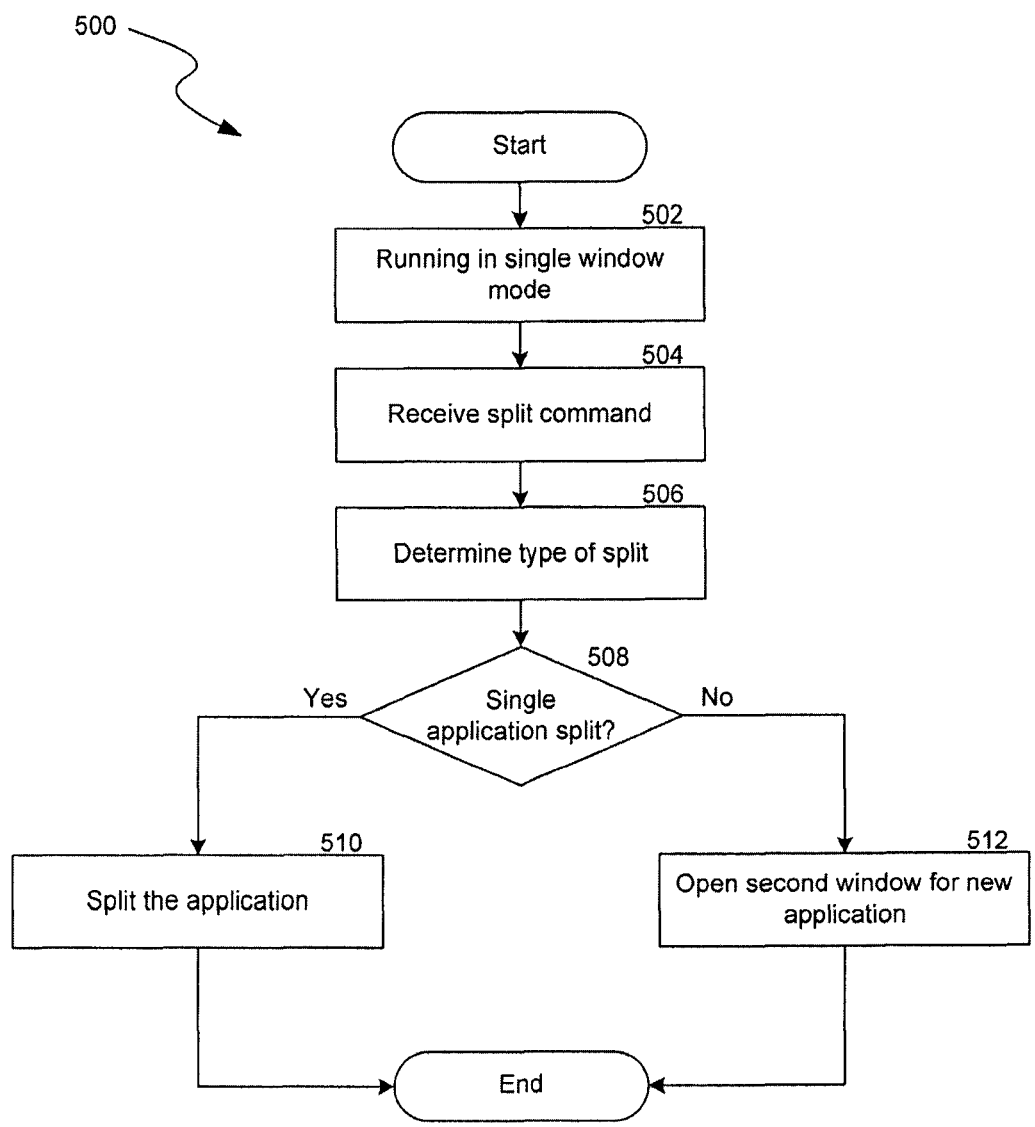
FIG. 5 is a flow chart of a process implemented by a dual window system for switching from single window mode to dual window mode.

FIG. 5 is a flow chart of a process 500 implemented by the dual window system for switching from single window mode to dual window mode. The system begins in block 502, at which time it is running normally in a single window mode. In this mode, the application functions identically to an application running on a single window mobile device.

Figure 6A:
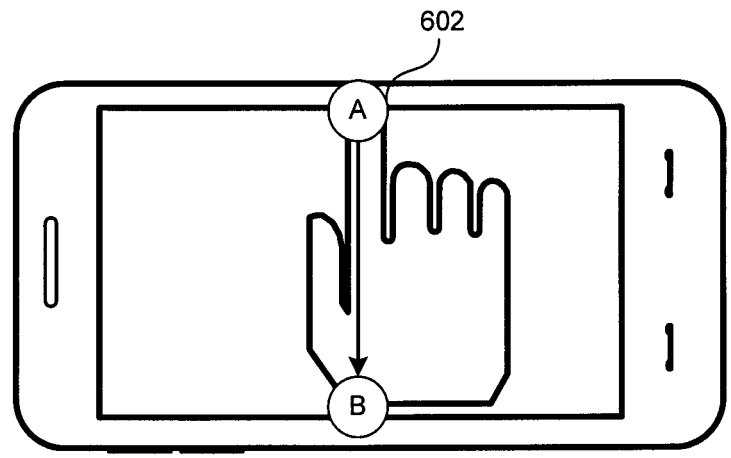
FIGS. 6A and 6B illustrate a process in which the user initiates a transition between single window mode and dual window mode by drawing a line across a touch-sensitive screen.
Figure 6B:
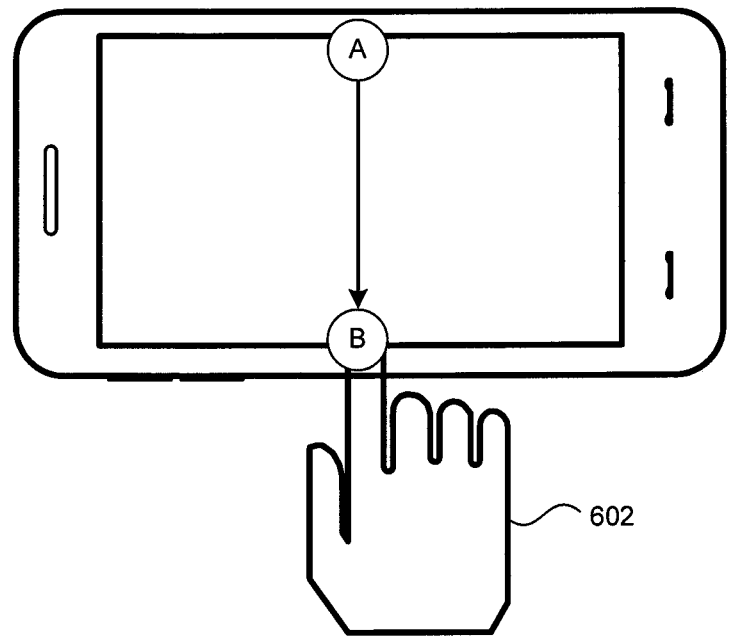

Proceeding to block 504, the system receives a split command. The transition between modes can be triggered in a number of ways. In some embodiments, the user initiates the transition by pressing a key or with a gesture on a touch-sensitive screen 206. For example, FIGS. 6A and 6B illustrate a process in which the user initiates the transition by drawing a line across the touch-sensitive screen 206. Thus, in FIG. 6A, the user's finger 602 is located at point A, while the system is operating in single window mode. In FIG. 6B, the user's finger 602 has moved across the touch-sensitive screen 206 to point B, indicating that the system should split the windows. The system may be configured to split the screen into equal or unequal parts. In FIGS. 6A and 6B, the line was drawn at the middle of the screen, indicating that the interface should split the screen into equal parts. However, the system may make an uneven split between windows based on the location of the user's gesture. Alternatively, the system may always split the screen into equal parts, regardless of where the line is drawn. The system may be configured to place a menu bar at the location of the line drawn by the user or to place a menu bar at a standard location, such as at the top or bottom of the window(s) or between the windows.

The transition between modes might also be automatically initiated by the application. In some embodiments, an application is configured to split windows when the device transitions from portrait mode to landscape mode. In other embodiments, the application automatically initiates the split when the user selects particular functions. For example, an IM application might launch in single window mode, displaying only the user's contacts. When the user selects a particular contact to message with, the IM application could initiate the transition to split windows. In that case, the IM application could continue to display the contact list in the first window while displaying the ongoing conversation in the second window. One advantage of this is that it allows the user to easily add new people to the ongoing conversation in the second window by selecting additional users from the contact list in the first window.

Regardless of how the split command is generated, after the command is received, the system proceeds to block 506, where it determines the type of split being requested. In particular, the system determines if it should split an application into two windows or open a second application in the second window. As in the startup process, the system might be configured to always respond to certain commands by splitting the application. For example, the user could configure the system to always split the application in response to a particular gesture on a touch-sensitive screen 206. Of course, if the application initiated the split, it can also inform the system of what type of split to execute. In the case of the IM application discussed above, the application tells the system to do a single application split. On the other hand, a contacts application such as in FIG. 2 could allow the user to launch an IM session directly from the contacts. In that case, the system could place the contacts list in the first window while placing the IM chat in the second window.

After the system determines what type of split has been requested, it proceeds to decision block 508, where it evaluates the result of the determination. If the split command requested a single application split, processing continues in block 510, where the system splits the running application into separate windows. In that case, the running application is granted control of both windows. If the system has determined that the split command is not a single application split, processing continues in block 512, where the system opens a second window to hold a new application.

In some embodiments, the device is configured to automatically shift to dual window mode if the user launches a new application while a current application is running. In those embodiments, the new application is automatically given control over the second window as it launches. Alternatively, the system can respond to a split command by opening an empty window and providing a list of applications to the user. This list could be of all of the applications available on the device. The list might also be customized to show the most commonly used applications or to display the user's favorite applications.

Figure 7:
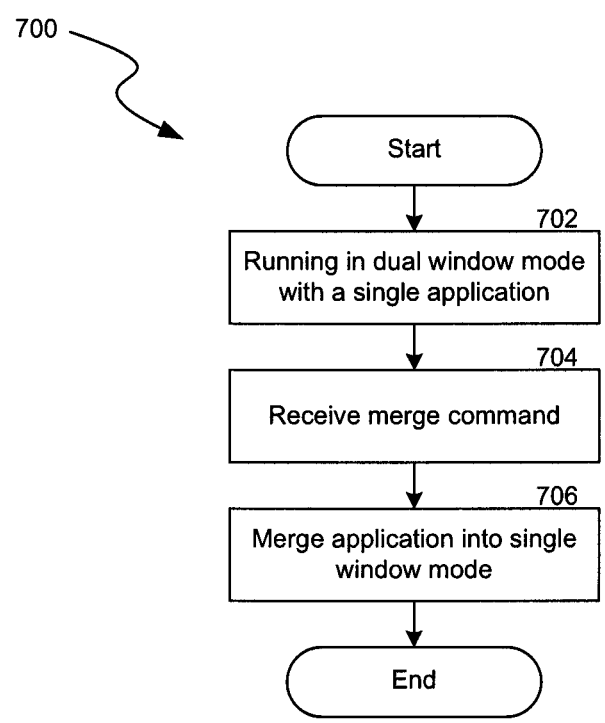
FIG. 7 is a flow chart of a process implemented by a dual window system for merging windows of a single application in dual window mode.

FIG. 7 is a flow chart of a process 700 implemented by the dual window system for merging windows. The system begins in block 702, where it is running a single application in dual window mode. Proceeding to block 704, the system receives a merge command. As with the split command, the merge command could be generated in a number of ways. For example, the user might directly provide the command by selecting a menu item or by making a gesture on a touch-sensitive screen 206. Alternatively, the merge could be done automatically by the application. For example, an application could automatically merge windows when the user switches from landscape to portrait modes. Or, if the application switched to dual window mode to perform a specific task, it could revert to single window mode when the task has been completed. As an example, the instant messenger application could automatically revert to a single window when the user ends a chat session. After the merge command is received, the system proceeds to block 706, where it merges the application into a single window, such as the single-window interface shown in FIG. 2A.

Figure 8:
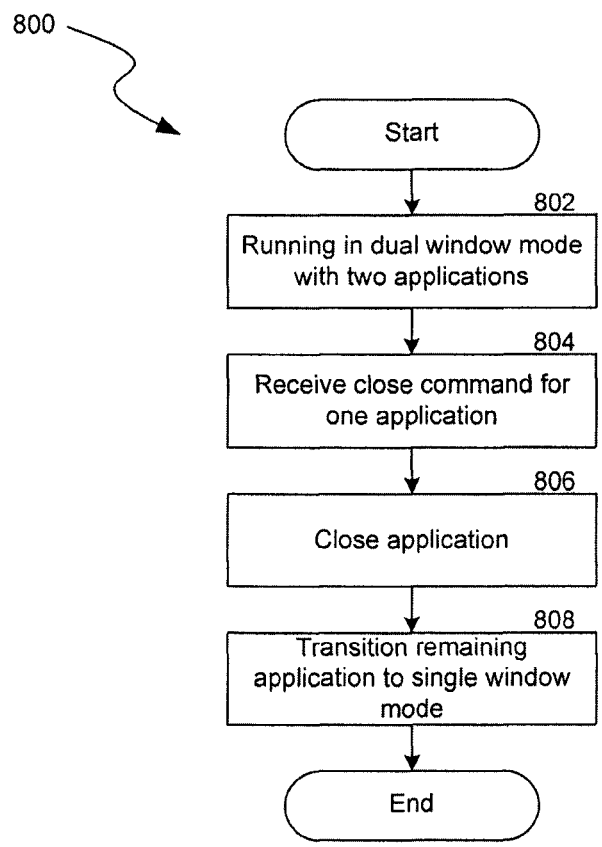
FIG. 8 is a flow chart of a process implemented by a dual window system for closing an application when running two applications in dual window mode.

FIG. 8 is a flow chart of a process 800 implemented by the dual window system for closing an application. The system begins in block 802, where it is running two applications in dual window mode. Proceeding to block 804, the system receives a close command to one of the applications. The system then proceeds to block 806, where it closes the application. After the application is closed, the system proceeds to block 808, where it transitions the remaining application to single window mode. Alternatively, the system could be configured to remain in dual window mode even after the application is closed. In that case, the system might allow the user to select a new application to open in the now unoccupied window. As with the split window command, the system could do this by showing a list of most recently used applications or of user favorites.

One skilled in the art will appreciate that the dual window interface can be used in a number of ways. In one implementation, the dual window display can also provide copy and paste between windows. For example, the user may select text displayed in one window and have it automatically inserted in an input box on the other window. This gives the user clear feedback on what information is being moved.

The system could also be configured to launch certain applications in pairs, automatically splitting the windows. Similarly, it could be configured to always launch a second application when the user launches a first application (e.g. dialing application is always paired with contacts).

Figure 9:
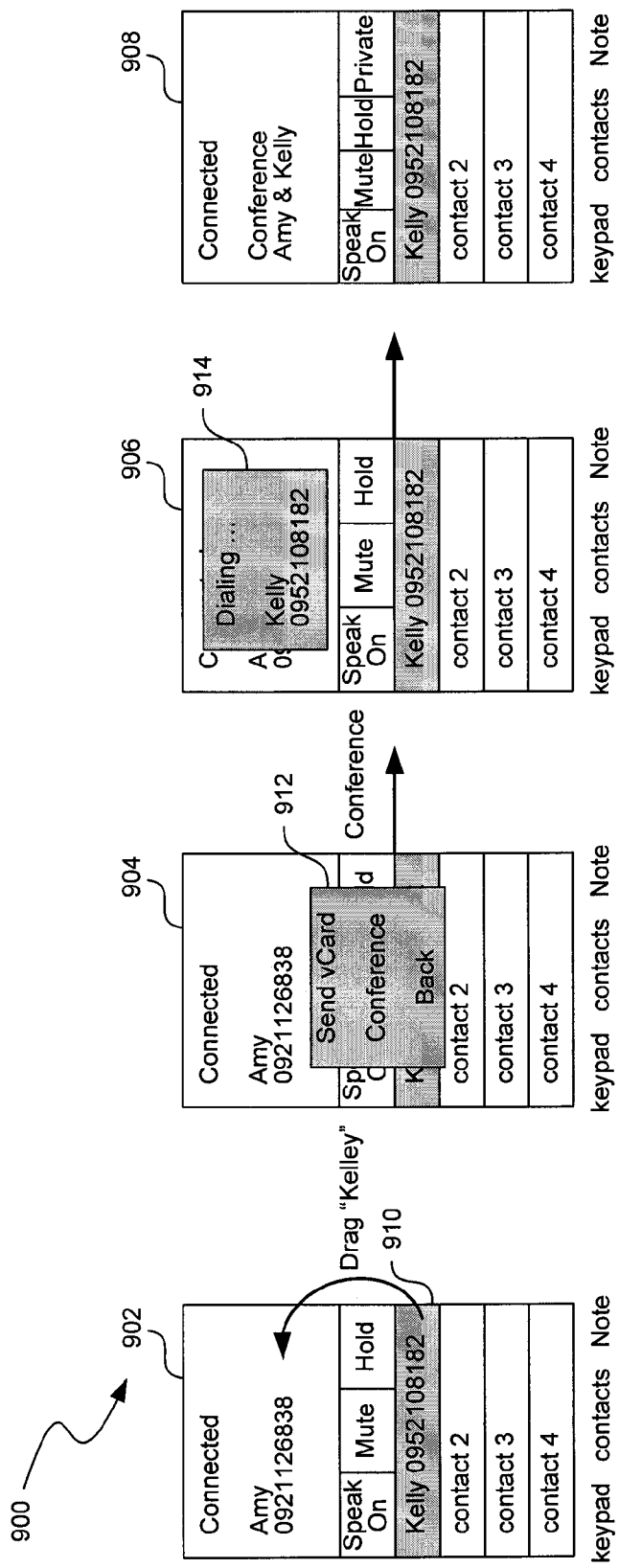
FIG. 9 illustrates a process for initiating a conference call using a dual window system.
Figure 10A:
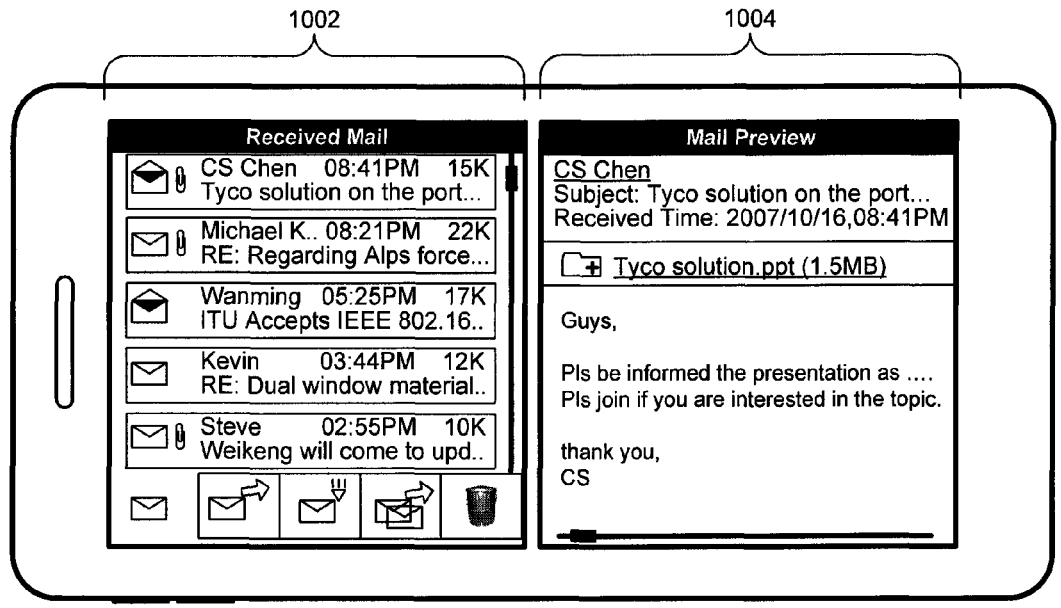
FIG. 10A illustrates an e-mail application using a dual window interface to display e-mail folders and contents.
Figure 10B:
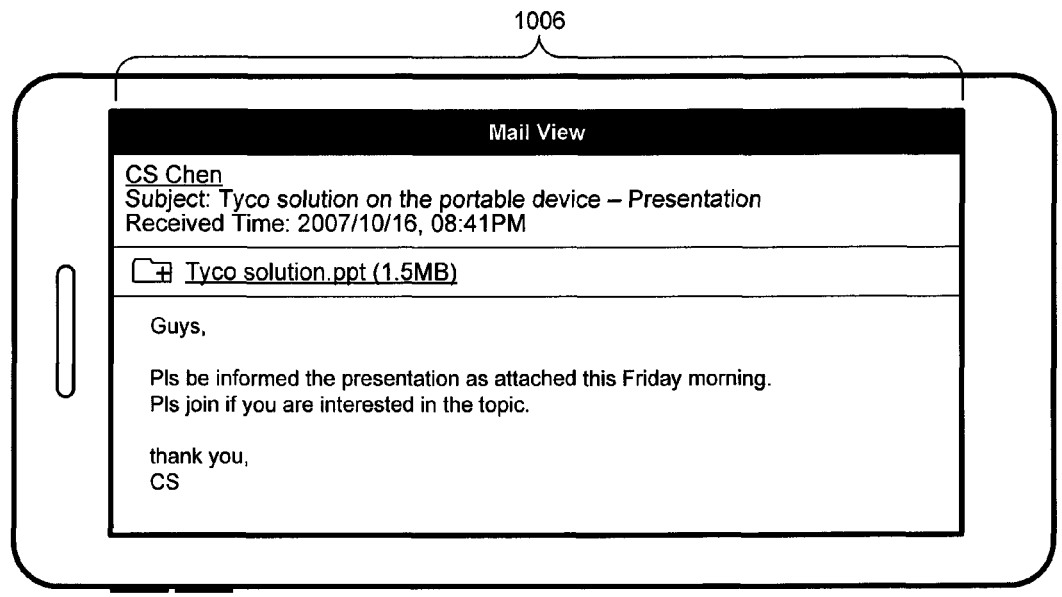
FIG. 10B illustrates an e-mail application operating in the single window mode to display a selected e-mail.

The dual window interface can also be used to simplify the process of setting up a conference call. FIG. 9 illustrates a process 900 for initiating a conference call using a dual window system. In step 902, the telephone is connected in a telephone call to a single person, Amy. To initiate a conference call, the user selects the contact list item 910 for the additional person for the call, Kelly, and drags the item 910 into the dialing window 216. In step 904, the dual interface system responds to the user's action by displaying a dialog 912 providing options to the user, including options to send a vCard and to initiate a conference call. If the user selects the "Conference" option, the system proceeds to step 906, where it dials the second contact. The system may also display a status dialog 914 to indicate that the action is being performed. If the connection is successful, the system proceeds to step 908, where the user is able to speak to two people in the conference call. This process could be repeated to add additional contacts to the conference call.

Figure 11:
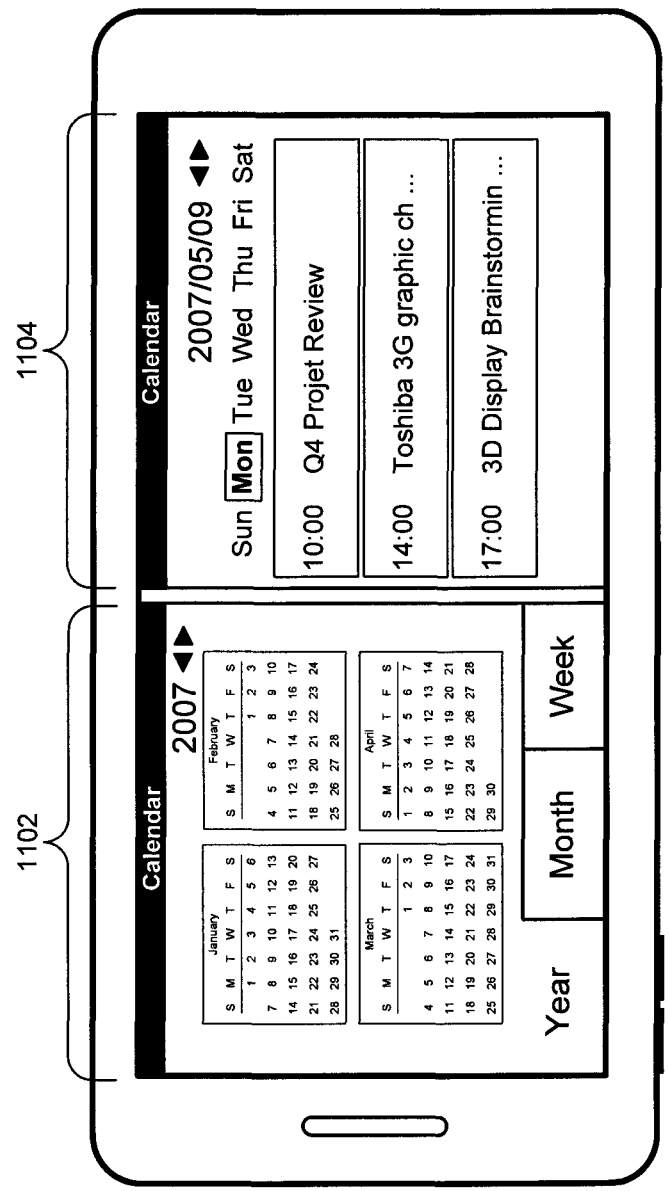
FIG. 11 shows a calendar application using the dual window interface to display a calendar application.

FIGS. 10-13 illustrate other mobile applications configured to make use of the dual window interface. For example, FIG. 10A illustrates an e-mail application using the dual window interface to view a listing 1002 of e-mails in a selected folder and a preview 1004 of a selected e-mail. FIG. 10B illustrates the e-mail application operating in the single window mode to display a selected e-mail 1006. Similarly, FIG. 11 shows a calendar application using the dual window interface to display an overview calendar 1102 in the first window and a selected appointment 1104 in the second window.

Figure 12A:
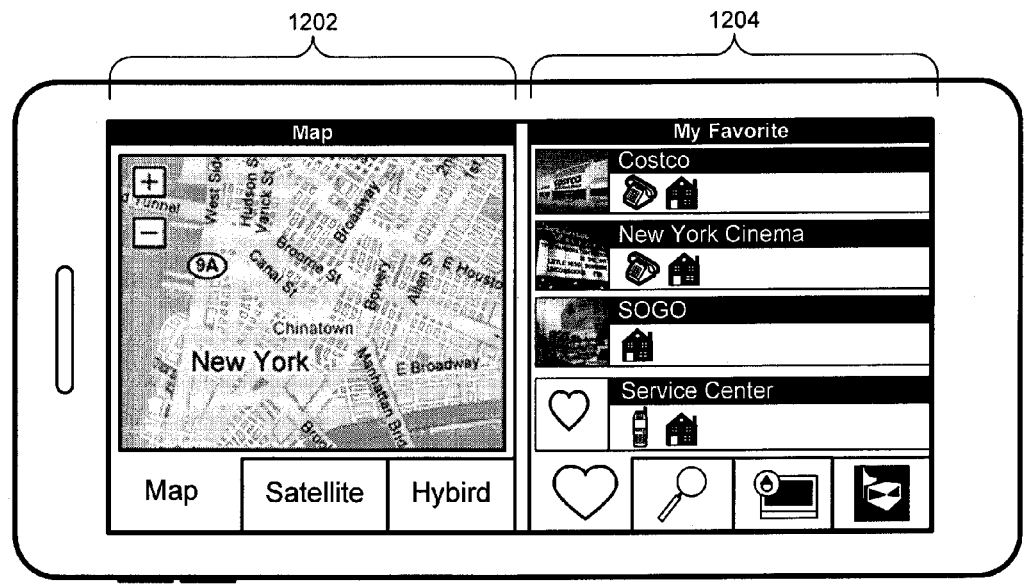
FIG. 12A illustrates a GPS application operating in a dual window mode.
Figure 12B:
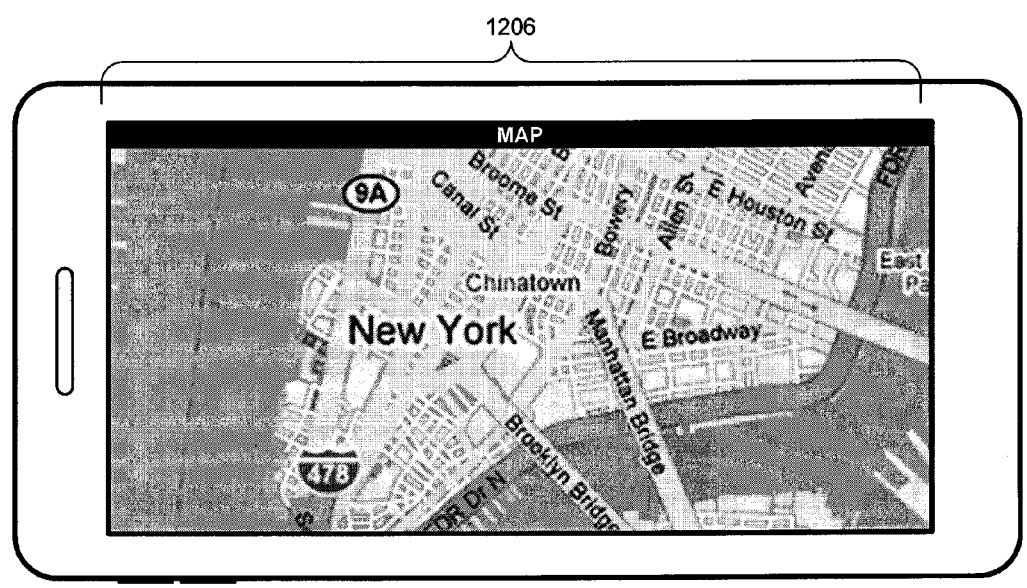
FIG. 12B illustrates a GPS application operating in a single window mode.

FIG. 12A illustrates a GPS application operating in the dual window mode to show a map 1202 in the first window and a listing of points of interest 1204 in the second window. The GPS application might also allow the user to use the second window to modify map display settings or to input a destination address or specific business that should be displayed on the map. FIG. 12B illustrates the GPS application operating in the single window mode to display the selected map 1206 using the full screen.

Figure 13:
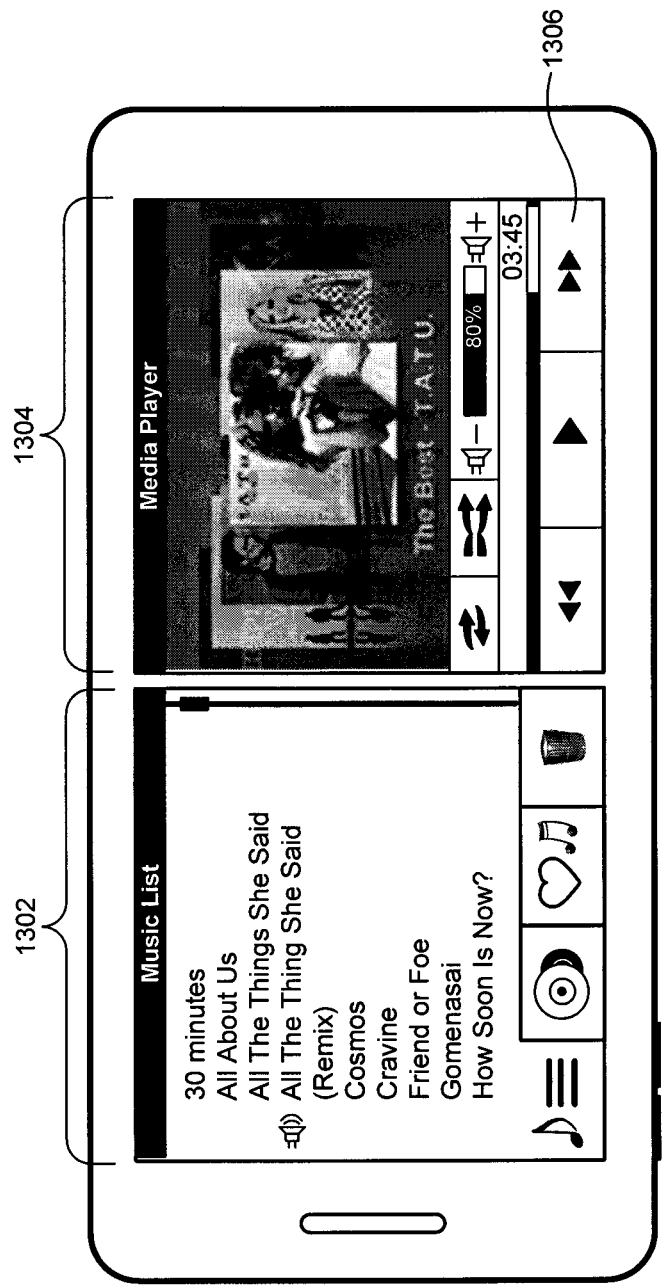
FIG. 13 illustrates a music player application operating in the dual window mode.

Music player and photo album applications are also well-suited to the dual window system. For example, FIG. 13 illustrates a music player application operating in the dual window mode. The music player application shows the songs of a playlist 1302 in the first window, while displaying information 1304 about the current song and play/pause/seek controls 1306 in the second window. As shown in FIG. 13, the music player application also shows album art for the selected song or playlist. A photo album application could offer a similar configuration to allow the user to make a slideshow from photos in the album.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A mobile communication device, comprising:
a housing having a form factor suitable for handheld use;
a display screen carried by the housing;
a touch-sensitive input component configured to receive user input to the mobile communication device based on gestures on the touch-sensitive input component;
a storage component configured to store a mobile application;
a processor configured to execute the mobile application;
a first window control component associated with a first application and configured to control a first interface displayed on a first portion of the display screen and to respond to inputs directed to the first portion of the display screen, wherein the first interface displayed on the first portion of the display screen is configured to simultaneously display the first application and receive user input;
a second window control component associated with a second application and configured to control a second interface displayed on a second portion of the display screen and to respond to inputs directed to the second portion of the display screen, wherein the second interface displayed on the second portion of the display screen is configured to simultaneously display the second application and receive user input; and
a coordinator component configured to generate a command from the first application to the second application in response to a user gesture to the touch-sensitive input component indicating an interaction between the first portion of the display screen and the second portion of the display screen, to provide the command from the first application to the second application, and to selectively enable or disable the first window control component and the second window control component to switch the mobile communication device between a single window mode and a dual window mode;
wherein when the mobile communication device is in the dual window mode, the mobile communication device simultaneously displays the first interface and the second interface.

2. The mobile communication device of claim 1, wherein the coordinator component is configured to switch the mobile communication device to the single window mode when the second mobile application is deactivated.

3. The mobile communication device of claim 1, wherein the coordinator component is configured to switch between the single window mode and the dual window mode in response to a user command received from the touch-sensitive input component.

4. The mobile communication device of claim 1, wherein the second window control component is inactive when the mobile communication device is in the single window mode.

5. The mobile communication device of claim 1, wherein the touch-sensitive input component includes a touch-sensitive screen.

6. The mobile communication device of claim 1, wherein the size of the first portion of the display screen is equal to the size of the second portion of the display screen.

7. The mobile communication device of claim 6, wherein the first portion of the display screen and the second portion of the display screen are square.

8. The mobile communication device of claim 1, wherein the coordinator is further configured to switch the mobile communication device to the dual window mode in response to a command gesture received through the touch-sensitive screen.

9. The mobile communication device of claim 1, wherein:
the touch-sensitive input component includes a touch-sensitive screen,
the coordinator is further configured to switch the mobile communication device in the dual window mode in response to a command gesture received through the touch-sensitive screen, and
the first window control component is further configured to display a control menu at a location on the display corresponding to the location of the command gesture on the touch-sensitive screen.

10. A mobile communication device, comprising:
a housing having a form factor suitable for handheld use;
a display screen carried by the housing, wherein the display screen is capable of displaying one or more windows;
a touch-sensitive component;
an interface management component configured to selectively vary the number of windows, wherein each of the windows is displayed on a portion of the display screen, is associated with a separate application, and can be independently controlled, and wherein each of the windows is configured to simultaneously display the respective associated separate application and receive user input;

an input component configured to receive user input from the touch-sensitive component corresponding to a user gesture indicating an interaction between a first window displayed by the display screen and corresponding to a first application and a second window displayed by the display screen and corresponding to a second application, wherein the interface management component is further configured to generate a command from the first application to the second application corresponding to the user gesture and to provide the command from the first application to the second application; and wherein when the mobile communication device is in a multiple window mode, the mobile communication device simultaneously displays the first window and the second window.

11. The mobile communication device of claim 10, wherein the display screen can display either one or two windows.

12. The mobile communication device of claim 10, wherein:
the mobile communication device is capable of running a plurality of mobile applications simultaneously; and
the interface management component is further configured to display an interface for a different mobile application in each of the one or more windows.

13. The mobile communication device of claim 10, wherein the interface management component is configured to change the number of displayed windows in response to a user command.

14. The mobile communication device of claim 10, wherein:
the first application is a contacts application, the display including a contact list item having an associated telephone number; and
the second application is a telephone dialing application, wherein the user gesture is dragging the contact list item from the first window to the second window and wherein the telephone dialing application is configured to dial the associated telephone number in response to the command.

15. The mobile communication device of claim 10, wherein:
the first application is a contacts application, the display including a contact list item having an associated telephone number; and
the second application is a telephone dialing application, wherein the user gesture is dragging the contact list item from the first window to the second window and wherein when a telephone call with a first remote device is in progress, the telephone dialing application is configured to initiate a conference call including the first remote device and the associated telephone number in response to the command.

16. A mobile communication device, comprising:
housing having a form factor suitable for handheld use;
display screen carried in the housing;
means for receiving user input corresponding to user gestures on a touch-sensitive component of the mobile communication device;

first control means for controlling an interface associated with a first application displayed on a first window on a first portion of the display screen;

second control means for controlling an interface associated with a second application, separate from the first application displayed, on a second window on a second portion of the display screen, wherein the second control means is capable of controlling the display screen simultaneously with the first control means;

means for simultaneously displaying the first application and receiving user input on the first window;

means for simultaneously displaying the second application and receiving input on the second window; and means for coordinating the activity of the first control means and the second control means to receive user input from the means for receiving corresponding to a user gesture indicating an interaction between the first window and the second window, to generate a command from the first application to the second application corresponding to the user gesture, to provide the command from the first application to the second application and to selectively enable or disable the first control means and the second control means to switch the mobile communication device between a single window mode and a dual window mode;

wherein when the mobile communication device is in the dual window mode, the mobile communication device simultaneously displays the first window and the second window.

17. The mobile communication device of claim 16, wherein the means for receiving user input is configured to send commands directed to the first window to the first control means and to send commands directed to the second window to the second control means.

18. The mobile communication device of claim 16, wherein the means for coordinating is configured to switch the mobile communication device between the single window mode and the dual window mode in response to a user command.

19. The mobile communication device of claim 16, wherein the means for coordinating is configured to change the size, location, or orientation of the first window of the display screen.

20. The mobile communication device of claim 19, wherein the means for coordinating is configured to automatically change the size, location, or orientation in response to a change in the orientation of the mobile communication device.

21. A method for controlling a user interface of a mobile communication device having a form factor suitable for handheld use, comprising:
accepting a first input requesting a change in a user interface that is capable of displaying one or more windows on a display screen of the mobile communication device;
determining whether the requested change directs the user interface to display a single window interface or a multiple window interface;
displaying the single window interface or the multiple window interface according to the determination;
when displaying the multiple window interface, displaying a first window associated with a first application on a first portion of the display screen, and a second window associated with a second application on a second portion of the display screen separate from the first application, wherein the first window is configured to simultaneously display the first application and receive user input, and wherein the second window is configured to simultaneously display the second application and receive user input;

receiving user input corresponding to a user gesture on a touch-sensitive component of the mobile communication device and indicating an interaction between the first window and the second window;

generating a command from the first application to the second application based on the user input corresponding to the user gesture on the touch-sensitive component; and providing the command from the first application to the second application;

wherein when the mobile communication device is in the multiple window interface, the mobile communication device simultaneously displays the first window and the second window.

22. The method of claim 21, wherein accepting an input further comprises:
launching a mobile application; and
receiving configuration information associated with the application requesting the change in the user interface.

23. The method of claim 21, wherein:
the user interface is initially displaying a single window interface of a first mobile application; and
the input is a command to open a second mobile application and display the multiple window interface having two windows.

24. The method of claim 21, wherein:
the user interface is initially displaying a multiple window interface with an interface of a first mobile application displayed in all of the windows; and
the input is a command to display a single window interface.

25. The method of claim 21, wherein:
the user interface is initially displaying the multiple window interface with two windows;
the input is a command to close the first mobile application; and
the determination is to display the single window interface with the interface of the second mobile application displayed.

26. A non-transitory computer-readable medium containing instructions for performing the method of claim 21.

* * * * *